J. WERNER, Jr.
Harvesters.
No. 151,328. Patented May 26, 1874.
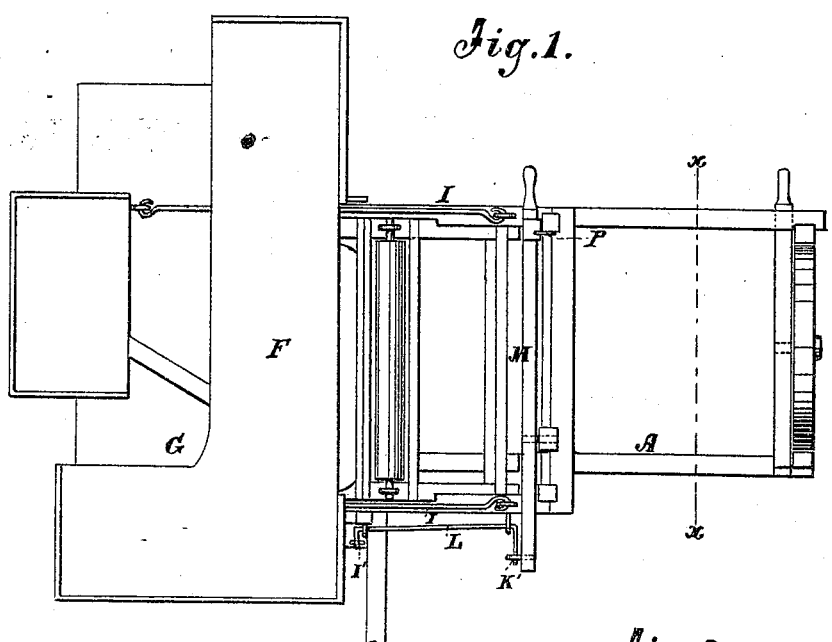
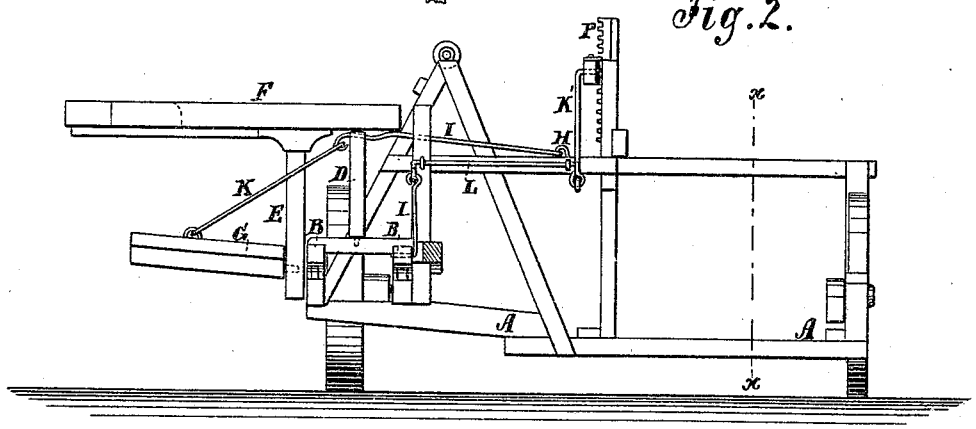
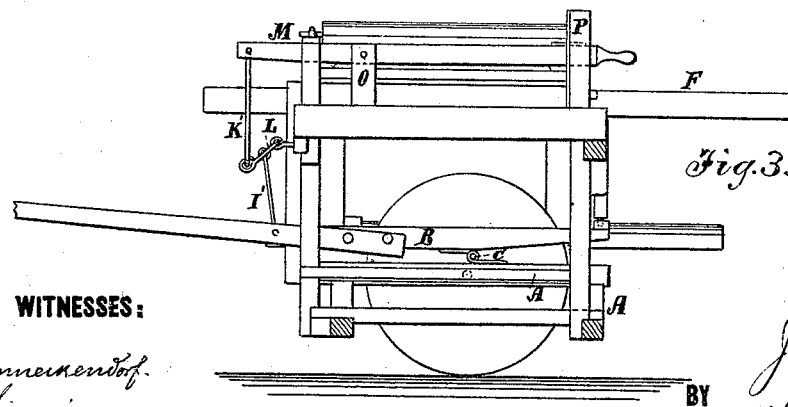

UNITED STATES PATENT OFFICE.

JOHN WERNER, JR., OF PRAIRIE DU SAC, WISCONSIN.

IMPROVEMENT IN HARVESTERS.

Specification forming part of Letters Patent No. 151,328, dated May 26, 1874; application filed November 8, 1873.

*To all whom it may concern:*

Be it known that I, JOHN WERNER, Jr., of Prairie du Sac, in the county of Sauk and State of Wisconsin, have invented a new and useful Improvement in Harvesters, of which the following is a specification:

My invention consists of the binders' platform and tables, attached to a tongue-frame, which is pivoted on the wheel-frame at or near the axis of the main wheel, and an adjusting-lever, connecting the wheel-frame and the tongue-frame, for adjusting the wheel-frame to tilt the cutters up or down, for cutting high or low, without tilting the platform and tables out of their proper level.

Figure 1 is a plan view of so much of a harvester as is necessary to illustrate my invention. Fig. 2 is a front elevation of the machine, and a section of the tongue; and Fig. 3 is a sectional elevation taken on the line $x\,x$ of Figs. 1 and 2.

A is the wheel-frame, on which the cutters and the grain-carrier are mounted. B is the tongue-frame, which is pivoted to the wheel-frame at C, and carries the standards D and E, to which the grain-table F is attached at the top, and platform G is attached to standards E near the bottom, and suspended from the top of D, and from the wheel-frame at H by the rods I K. The tongue-frame is connected at the front, by the rods I' K' and cranked rods L, with the short arm of the lever M, which is pivoted to the wheel-frame at O, and extends to the rear of it near the driver's seat, where it is shifted up and down along a locking-rack, P, in which it is fastened at any required height for holding the front of the wheel-frame and the cutters high or low.

The tongue-frame, resting at one point on the pivots C, and at another on the neck-yoke of the team, cannot tilt; consequently the platform and binders' table, being mounted on it, will remain in the level plane in which they are adjusted, and allow the wheel-frame to be shifted up or down at the front as needed, which is readily effected by the lever and the connections with the tongue-frame, which cause the wheel-frame to turn on the pivots C whenever the lever is shifted.

Having thus described my invention, I claim as new and desire to secure by Letters Patent—

1. The tongue-frame jointed to the wheel-frame, which supports the cutting apparatus, near the axis of the driving-wheel, and the binders' platform and tables attached to the tongue-frame, so that the cutters may be tilted without tilting the platform and tables, substantially as specified.

2. The binders' tables and stand, attached to the tongue-frame by the standards E, and supported from the wheel-frame by the rods K and I, substantially as specified.

JOHN WERNER, JR.

Witnesses:
THOMAS BAKER,
STEPHEN COBURN.